United States Patent
Song

(10) Patent No.: US 8,556,226 B2
(45) Date of Patent: Oct. 15, 2013

(54) VALVE WITH THE DEVICE ENHANCING CAPABILITY OF ITS CLOSURE MEMBER AND RELATED SEAT RING TO RESIST EROSION

(76) Inventor: Yongsheng Song, Shanghai (CN)

(*) Notice: Subject to any disclaimer, the term of this patent is extended or adjusted under 35 U.S.C. 154(b) by 906 days.

(21) Appl. No.: 12/301,024

(22) PCT Filed: May 15, 2006

(86) PCT No.: PCT/CN2006/000980
§ 371 (c)(1),
(2), (4) Date: Nov. 15, 2008

(87) PCT Pub. No.: WO2007/131388
PCT Pub. Date: Nov. 22, 2007

(65) Prior Publication Data
US 2009/0184277 A1 Jul. 23, 2009

(51) Int. Cl.
F16L 55/02 (2006.01)

(52) U.S. Cl.
USPC ........ 251/127; 251/118; 251/125; 137/625.3; 137/625.32

(58) Field of Classification Search
USPC ........ 251/118, 125, 127; 137/625.3, 625.326, 137/625.32
See application file for complete search history.

(56) References Cited

U.S. PATENT DOCUMENTS

| | | | |
|---|---|---|---|
| 4,693,450 A * | 9/1987 | Paetzel | 251/121 |
| 5,070,909 A * | 12/1991 | Davenport | 137/625.32 |
| 5,074,522 A * | 12/1991 | Reynolds et al. | 251/127 |
| 5,437,305 A * | 8/1995 | Leinen | 137/625.32 |
| 5,482,249 A * | 1/1996 | Schafbuch et al. | 251/118 |
| 5,988,586 A * | 11/1999 | Boger | 251/127 |
| 6,439,540 B1 * | 8/2002 | Tse | 251/127 |
| 7,089,963 B2 * | 8/2006 | Meheen | 138/44 |
| 7,131,514 B2 * | 11/2006 | Choi et al. | 181/270 |

* cited by examiner

Primary Examiner — John K Fristoe, Jr.
Assistant Examiner — Marina Tietjen
(74) Attorney, Agent, or Firm — Global IP Services; Tianhua Gu

(57) ABSTRACT

There is a closure member for rotating or reciprocating movement between upstream and downstream passageways of a valve. A device, which consists of two or more elongated tubes whose cross sections form up into one or more files in moving direction of the closure member to divide the upstream passageway into many channels capable of leading the fluid to flow through, is disposed in the upstream passageway of the valve upstream of the closure member, consequently the upstream surface of the closure member can respectively open or close each channel in sequence while the closure member is rotating or reciprocating in the valve.

11 Claims, 4 Drawing Sheets

VALVE WITH THE DEVICE ENHANCING CAPABILITY OF ITS CLOSURE MEMBER AND RELATED SEAT RING TO RESIST EROSION

FIELD OF THE INVENTION

This invention relates to a valve, and especially to the valve provided with a closure member rotating or reciprocating between its upstream and downstream passageways to alter the size of circulation area of the valve for controlling the fluid flow, such as full and reduced bore valve, ball valve, hemispherical ball valve, V-bore (or segment) ball valve, plug valve, gate valve, etc. or other equipments having similar applications (hereafter referred simply to as valve). The embodiments according to the present invention can mitigate severe erosion of the upstream surface of the closure member and the circumferential surface of bore of related upstream seat ring by the fluid with solid particles (including grains, powders, crystals, polymers, etc., the same below) or liquid drops during on-off or regulating movement of the closure member.

The inventor filed international applications No. PCT/CN2005/001650 titled closing device of valve on Oct. 8, 2005 and No. PCT/CN2006/000193 titled valve seat on Feb. 5, 2006. The invention of the present application is a further development of the inventions of the above-mentioned PCT applications.

BACKGROUND OF THE INVENTION

Valve is frequently used in a variety of pipelines for conveying the fluid with the solid particles or liquid drops to attain the purpose for controlling the fluid flow by shutting off or regulating movement now. In addition to a closure member, it has one seat ring installed in a recess surrounding valve upstream passageway or two seat rings installed respectively in recesses surrounding valve upstream and downstream passageways used for keeping engagement with exterior surface of the closure member in order to shut off the fluid flow in the valve efficiently. Having flowed into the upstream passageway, the fluid with solid particles or liquid drops will be split into two branches during flowing to the upstream surface of the closure member. One branch of the fluid flows directly through the upstream opening encircled by the closure member and the upstream seat ring to downstream side of the valve unobstructedly. The other branch will change its flow direction after has impacted frontally on the upstream surface of the closure member exposed in the valve upstream passageway and made it eroded, some of it disperses radially pressing against the upstream surface and erodes it tangentially again, upon that it erodes radially the circumferential surface of bore of the upstream seat ring when impinges on it, and then the dispersed fluids converge into two streams flowing round it in opposite directions to erode tangentially it and the upstream surface of the closure member adjacent to it pressing against them during flowing upon them, and both of them flow respectively through the upstream opening to downstream side of the valve at last; the rest of it flows into the upstream opening pressing against the upstream surface of the closure member and eroding tangentially it, too.

Two ways are used in the prior art valve to enhance the capability of the closure member and the related seat ring for resisting erosion, as follows:

One way is to decrease the flow velocity of the fluid with solid particles or liquid drops flowing through the valve. The erosion rate of material increases exponentially when the particle velocity increases, accordingly the way decreasing flow velocity of the fluid in the valve can dramatically reduce the erosion rate of the upstream surface of the closure member and the circumferential surface of bore of the related seat ring, and prolong lifetime of the valve. But the way will diminish the flow rate flowing through the valve.

Another way used widely at present is to increase the surface hardness of eroded material. Both seat ring and closure member are made of erosion resistant alloys or exceptional hardness ceramics, or metal coated with hard alloys or metal ceramics on their surfaces to enhance the capability of the valve for resisting erosion according to the prior art. Based on research, the erosion rate of the material can be reduced markedly when its surface hardness is higher than the particles carried in the fluid. In fact, we do not hope at all that the sealing surfaces of the closure member and related seat ring are eroded by the fluid with the solid particles or liquid drops during opening and closing movement of the closure member, since any indentations or grooves caused by the erosion on their sealing surfaces will affect sealing effectiveness when the valve is at fully closed position, and leakage paths across the sealing surfaces will be eroded into heavy leaking openings for a moment by the particles or liquid drops passing through them. On the other hand, the fluid carries very hard solid particles such as silica in some processes; it is rather difficult for us to find a material which hardness is harder than them up to now. The fabricating cost of the valve, including material cost, hardening treatment charge and machining expense for hardened parts, will rise substantially even if such material could be found. In addition sizes of angle of incident between streamlines of the particles and planes of locations eroded on the upstream surface of the closure member are various while the closure member is moving, this fact also causes us difficultly to find a material which can resist eroding at a variety of angles of incidence. Moreover erosion rate is affected by many complex factors, for example, shape, size and brittleness of the solid particles carried in the fluid, as well as concentration of the particles, consequently the complicated and knotty problem can not be solved only by improving surface hardness of the material.

THE SUMMARY OF THE PRESENT INVENTION

The present invention is aimed at making good the shortage of the prior art mentioned above, to make the closure member rotating or reciprocating between the upstream and downstream passageways for shutting off or regulating the fluid flow and the related upstream seat ring, eroded as less as possible by the fluid carrying the solid particles or liquid drops.

In accordance with the principles of the present invention, a device for enhancing the capability of the closure member and the related seat ring to resist erosion by the fluid with the solid particles or liquid drops is mounted in the upstream passageway of the valve upstream of the closure member.

The device is a cylindrical assembly with a cross section of honeycomb or reticulation enclosed by several concentric circular plates joined with stiffening ribs for strength, or formed of some corrugated metal plates disposed oppositely and welded together at their crests, or consisted of many elongated tubes having regular geometrical shape across section (such as sectorial, circular, square, rectangular, trapezoidal, triangular, hexagonal or elliptic) or abnormal geometrical shape across section side by side and welded together along their adjacent external surfaces, so that many elongated tubes, whose axes are parallel to axis of the upstream passageway, come into being in the valve upstream passageway. The cylindrical exterior surface of the devices can be directly attached to interior circumferential surface of the valve upstream passageway firmly, or is attached to interior circumferential surface of a sleeve in advance and then the sleeve is inserted in the upstream passageway. For the latter one, size and geometrical shape of exterior circumferential surface of the sleeve match the ones of the interior circumferential surface of the upstream passageway. Radial end surface of one end of the devices close to the closure member has the same geometrical shape and curvature as the upstream surface of the closure member, and keeps an equal clearance or engages with it. Size and geometrical shape of cross section of the elongated tubes in the devices can be the same each other or not. The elongated tubes in the devices divide the valve upstream passageway into many channels to permit the fluid to flow through, so that the fluid flowing into the upstream passageway towards the closure member is split into many streams flowing in the channels. Cross sections of the elongated tubes form up into two or more files in moving direction of the closure member, and the upstream surface of the closure member can respectively open or close each channel in every file in sequence when it rotates or reciprocates in the valve. There are many small through holes or apertures staggered each other in side walls of the elongated tubes.

Or the device is a mechanism consisted of one piece or more pieces of quadrilateral baffle plates arranged in one or more planes formed from axis (or the straight lines parallel to the axis) of the upstream passageway and a straight line simultaneously perpendicular to the axis (or straight lines parallel to the axis) and a straight line in moving direction of the closure member, and stiffening ribs can be provided for joining the baffle plates for strength. The baffle plates can be directly attached to the interior circumferential surface of the valve upstream passageway firmly, or is attached to the interior circumferential surface of a sleeve in advance and then the sleeve is inserted in the upstream passageway. For the latter one, size and geometrical shape of exterior circumferential surface of the sleeve match the ones of the interior circumferential surface of the valve upstream passageway. The baffle plates take the shape of rectangular for full bore valve and trapezoidal for reduced ball valve, a pair of its opposite sides of baffle plates is attached to the interior circumferential surface of the upstream passageway of the valve or the sleeve. One side of the other pair of its opposite sides has the same geometrical shape and curvature as the upstream surface of the closure member keeping an equal clearance or engaging with it. The baffle plates in the device divide the upstream passageway of the valve into two or more channels, whose cross sections form up into one single file (two or more files when the stiffening ribs are used) in moving direction of the closure member, to permit the fluid to flow through, so that the fluid flowing into the upstream passageway towards the closure member is split into two or more streams flowing in these channels. The upstream surface of the closure member can respectively open or close each channel divided by the baffle plates (or each channel in every file divided by the baffle plates joined with the stiffening ribs) in sequence while it is rotating or reciprocating between the upstream and downstream passageways of the valve. There are many small through holes or apertures staggered each other in the baffle plates.

Each of the channels in these tube devices and baffle plate device will be one under three conditions during on-off or regulating movement of the closure member. Some of the channels (or only one) are opened fully, and any part of the upstream surface of the closure member is not exposed in them (or it), the fluid can flow through unobstructedly to downstream of the valve; another channels (or only one) are closed, the fluid is blocked by the upstream surface and stagnated in them (or it) not to flow; the rest are partly opened (or partly closed), the fluid in them will flow to downstream of the valve after has been obstructed and regulated by the upstream surface of the closure member.

Only the last one under three conditions will make the upstream surface of the closure member exposed in these channels and the circumferential surface of bore of the upstream seat ring adjacent to it be eroded in accordance with the principles of the present invention, so part of the upstream surface and circumferential surface exposed in the valve upstream passageway will be merely eroded. As a result, eroded width of the upstream surface in moving direction of the closure member and eroded arc length of the circumferential surface adjacent to it are greatly decreased, as compared with the prior art valve in which the whole width of the upstream surface exposed in the valve upstream passageway in moving direction of the closure member and arc length of the circumferential surface of the seat ring adjacent to it will be eroded more or less.

The stream stagnated in the channel blocked completely can not flow, or flow only through the clearance between end face of the devices and the upstream surface of the closure member at very low velocity during on-off or regulating movement of the closure member. The channel having been opened, the flow velocity of the stream in it starts to be accelerated by differential pressure across the valve, and will reach up to a maximum after the upstream surface of the closure member has been out of the channel. Consequently, with the exception of stream in the first opened channel (or last closed channel) adjacent to the circumferential surface of bore of the upstream seat ring when the valve has been just opened (or before the valve has been fully closed), the mean velocity of the stream in the others is lower than the one within a range between two corresponding opening positions of the prior art valve. As a result, the eroded extent of the upstream and circumferential surfaces exposed in the channel obstructed partly gets to be mitigated comparing with the prior art valve.

The wall thickness of tubes or baffle plates in cross section of the devices will make the fluid flow meet the some resistance when the valve is fully opened.

The static pressure of the stream in channel blocked fully (or obstructed partly) in the devices is higher than one in adjacent channel obstructed partly (or opened fully) in which the flow is at higher velocity.

If radial end face of one end of the devices keeps an appropriate clearance with the upstream surface of the closure member, the differential pressure between two streams in adjacent channels blocked fully and obstructed partly causes the small part of stream stagnated in the channel blocked fully to flow through the clearance into the channel obstructed partly at so low velocity which will not make the upstream surface of the closure member exposed in the channel blocked fully and the circumferential surface of bore of the seat ring adjacent to it be eroded. The flowing direction of flow layer flowing into the adjacent channel obstructed partly through the clearance is nearly vertical to streamline of the stream flowing in it, consequently the upstream surface of the closure member exposed in the channel obstructed partly and the adjacent circumferential surface of bore of the seat ring can be cushioned by this flow layer against the erosion by the stream flowing at a higher velocity.

Meanwhile, this differential pressure causes the small part of stream in the channel blocked fully to flow vertically into adjacent channel obstructed partly through many staggered small through holes or apertures in the tube wall or baffle plate. These smaller streams flowing through the small through holes or apertures are blended with the stream in the latter channel to make its kinetic energy be reduced, and many flow layers formed of the smaller streams normal to streamline of the latter stream are created at a distance from the tube wall or baffle plate over the upstream surface of the closure member exposed in the channel obstructed partly. The upstream surface of the closure member exposed in it and the adjacent circumferential surface of bore of the seat ring can be also separated from the latter stream by these layers and cushioned against erosion by the solid particles or liquid drops carried in the stream, On the other hand, many smaller streams will push the stream flowing in the channel obstructed partly away from the tube wall or baffle plate adjacent to the channel blocked fully to press to its opposite surface, or circumferential surface of the valve upstream passageway when the channel is the first opened (or last closed) in the devices, and cause the stream to flow through the latter channel in the way being more aimed at the valve upstream opening, thus the erosion of the upstream surface of the closure member exposed in it and the adjacent circumferential surface of bore of the seat ring is also reduced.

The differential pressure between two streams in adjacent channels opened fully and obstructed partly likewise causes part of the stream in latter one to flow into the former one through many small through holes or apertures staggered each other in their common tube wall or baffle plate, and the streamlines of the stream in the channel obstructed partly are deflected or sucked close to the wall or plate by the smaller streams flowing through the small through holes or apertures, so that the stream in the channel obstructed partly will flow through it in the way being more aimed at the valve upstream opening, thus erosion extent of the upstream surface of the closure member exposed in channel obstructed partly and the adjacent circumferential surface of bore of the seat ring by the solid particles or liquid drops carried in the stream can be reduced.

Therefore the eroded surfaces exposed in the valve upstream passageway are only the upstream surface of the closure member exposed in the channel obstructed partly and the circumferential surface of bore of the upstream seat ring adjacent to it. The upstream surface exposed in the channel blocked fully will be protected without being eroded since the fluid in them can not flow, or flow just at very low velocity due to an appropriate clearance between end face of the device and the upstream surface of the closure member, even through it is still exposed in the valve upstream passageway.

In comparison with the prior art valve, only part of the upstream surface (which is close to the upstream opening of the valve) exposed in the channel obstructed partly and the circumferential surface of bore of the upstream seat ring adjacent to it will be eroded by the fluid with the solid particles or liquid drops in the valve provided with present invention devices, and the eroded width and arc length of both surfaces are not only shortened, but eroded extent is reduced effectively owing to the decrease of mean velocity of the stream flowing in the channel obstructed partly and cushioning effect on the flow of the stream by the flow layers formed of the smaller streams, so lifetime of the valve gets to be prolonged.

The small and smaller streams flowing into the channels obstructed partly and opened fully through the clearance and the small through holes or apertures, can change the flow field of the fluid flowing through the upstream opening of valves, too. The modified flow field can mitigate erosion of the upstream seat ring and body housing of the valve.

BRIEF DESCRIPTION OF THE DRAWINGS

The above description, as well as further objects, features and advantages of the present invention will be more fully understood with reference to the following detailed description of a valve, when taken in conjunction with the accompanying drawings, wherein.

DETAILED DESCRIPTION OF PREFERRED EMBODIMENTS

The corresponding elements in each drawing are designated with identical like figures.

Figure 1A:
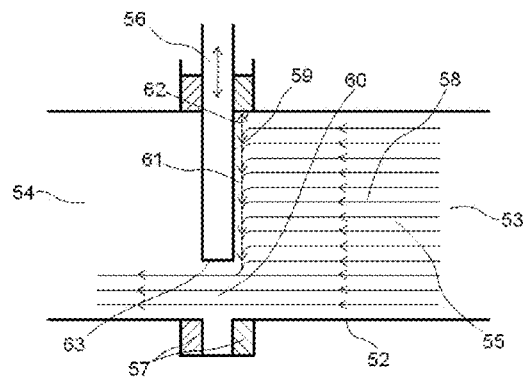
FIG. 1a and FIG. 1b are two simplified elevation section views of a prior art gate valve, showing a closure member in different opening (or closing) positions respectively during its on-off or regulating movement.
Figure 1B:
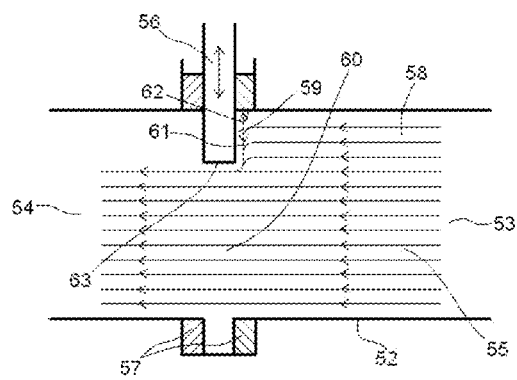

FIG. 1 is consisted of FIG. 1a and FIG. 1b, is a simplified elevation section view of a prior art gate valve, showing the closure member in different opening (or closing) positions. The housing of the gate valve in FIG. 1 is designated as figure 52, its upstream and downstream passageways as figures 53 and 54 respectively. Cross section of the passageways is generally cylindrical (or any other geometrical shapes, such as truncated cone, square and rectangular). Fluid 55 flowing through valve housing 52 is shown by streamlines. Gate closure member 56 can reciprocate in the direction perpendicular to axis of passageways 53 and 54 or at a certain angle to the axis. Seat rings 57 are used for engaging with gate closure member 56 when the valve is at fully closed position, and do not let fluid 55 flow from upstream passageway 53 of valve housing 52 to its downstream passageway 54 together with it.

It can be understood from FIG. 1 that One branch of fluid 58 in fluid 55 impinges frontally on upstream surface 59 of gate closure member 56 (vertical to or at a certain angle) and makes it eroded during flowing to downstream passageway 54. Fluid 61 changed its flow direction after impingement disperses radially pressing against the upstream surface 59 and erodes it tangentially again. Upon that some of the dispersed fluids flow to circumferential surface 62 of bore of upstream seat ring 57 radially and erode it when impact on it, and then converge respectively into two streams flowing round circumferential surface 62 in opposite directions pressing against them and changing its flow direction continuously during flowing upon them, causing circumferential surface 62 and upstream surface 59 adjacent to it to be eroded tangentially, both of the streams flow respectively into downstream passageway 54 through opening 60 encircled by seat ring 57 and end 63 of gate closure member 56 at last; the others flow into the upstream opening 60 pressing against upstream surface 59 of the gate closure member 56 and erodes tangentially it, too. The other branch of the fluid flows directly through the upstream opening 60 to downstream side 54 of the valve unobstructedly. The width of eroded upstream surface 59 from end 63 upward in moving direction of gate closure member 56 and the arc length of eroded circumferential surface 62 adjacent to eroded surface 59 depend on size of valve opening 60. The larger opening 60 is, the shorter the width and arc length of the eroded surfaces are.

All of the drawings from FIG. 2 to FIG. 5 are the preferred embodiments according to the present invention. These and other features will be better understood in the discussion below, taken in conjunction with the drawings.

According to one embodiment of the present invention in FIG. 2, one quadrangular baffle plate 64 is disposed in the plane formed from axis of valve upstream passageway 53 and a straight line simultaneously perpendicular to the axis and a straight line in moving direction of gate closure member 56 or any planes parallel to it, so that the device containing two channels is created in the valve upstream passageway. Baffle plate 64 whose plane is perpendicular to moving direction of gate closure member 56 passes through the axis of upstream passageway 53, and takes the shape of rectangle (or trapezoid if the valve has a reduced bore).

baffle plate 64, whose a pair of opposite sides is arranged to coincide respectively with two straight lines intersected between circumferential surface of valve upstream passageway 53 and the plane mentioned above, is attached to the circumferential surface in any suitable manner, or interior circumferential surface of a sleeve (not shown) in advance in the manner mentioned above, and then the sleeve is inserted in passageway 53 conforming to the requirement that the plane of baffle plate 64 is perpendicular to moving direction of gate closure member 56.

For the latter one, size and geometrical shape of exterior circumferential surface of the sleeve match ones of the circumferential surface of valve upstream passageway 53. One side of its other pair of opposite sides having the same geometrical shape and curvature as upstream surface 59 is close to it with an appropriate and equal clearance 67 or engages with it. The manner in which baffle plate 64 is attached to passageway 53 or bore of the sleeve, and the sleeve to passageway 53 can be welding, tongue and groove, locating screw, key or pin, gluing and others. Baffle plate 64 in the device divides passageway 53 upstream of gate closure member 56 into two channels 65 and 66 whose cross sections form up into one single file in moving direction of gate closure member 56 to permit fluid 55 to flow through, so the device makes fluid 55 flowing into passageway 53 split into two streams 65*a* and 66*a* immediately at flowing into channels 65 and 66. Upstream surface 59 of gate closure member 56 can respectively open or close channels 65 and 66 in sequence during its on-off or regulating movement. There are many small through holes or apertures 68 staggered each other in baffle plate 64.

Quadrangular stiffening ribs (not shown) can be taken into account to join the baffle plates mounted in upstream passageway or bore of the sleeve for strength. The baffle plates with the stiffening ribs will divide the valve upstream passageway into many channels whose cross sections form up into several files in moving direction of gate closure member, the upstream surface of the gate closure member can respectively open or close each channel in every file in sequence during its on-off or regulating movement. There are also many small through holes or apertures staggered each other in the baffle plates and stiffening ribs.

The prior art valve in FIG. 1, not only will all upstream surface 59 of gate closure member 56 exposed in upstream passageway 53 and circumferential surface 62 of bore of the seat ring adjacent to it be eroded by fluid 55 more or less during on-off or regulating movement of the closure member, but also its eroded extent is increasing, with the fluid flow accelerated gradually.

The embodiment in FIG. 2 according to the present invention is quite different from it, valve upstream passageway 53 is divided by plate 64 into two channels 65 and 66 having the same cross section formed up into one single file in moving direction of gate closure member 56.

Figure 2A:
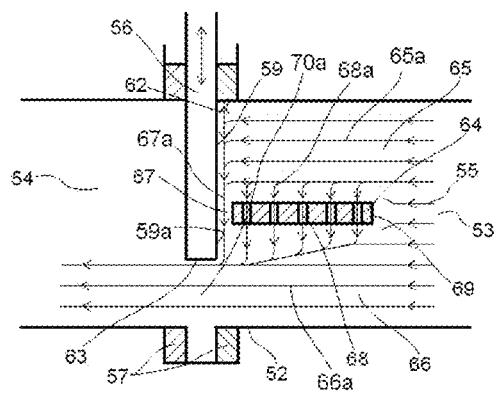
FIG. 2a and FIG. 2b are two simplified elevation section views of an improved gate valve provided with a device formed of one baffle plate according to an embodiment of the present invention, showing the closure member in different opening (or closing positions respectively.

When the valve is opened less than half as shown in FIG. 2*a*, stream 65*a* in channel 65 is stagnated therein and can not flow into channel 66 if the side of plate 64 close to upstream surface 59 of the closure member engages with surface 59. Because baffle plate 64 disposed in the valve upstream passageway has shut off the paths of two streams flowing round circumferential surface 62 of bore of seat ring in opposite directions into downstream passageway 54 of the valve through opening 70*a*, the situation is very different from the description in FIG. 1*a* above. In this wise, any part of upstream surface exposed in channel 65 and upper half a circumference of circumferential surface 62 adjacent to it can not be eroded by stream 65*a*. Furthermore, only upstream surface 59*a* close to valve opening 70*a* exposed in channel 66 and lower half a circumference of circumferential surface 62 of bore of the seat ring adjacent to it will be eroded by stream 66*a*.

According to the present invention, the width of eroded surface 59*a* in moving direction of the closure member and the arc length of eroded circumferential surface adjacent to surface 59*a* will not exceed half a diameter of valve upstream passageway 53 and half a circumference of circumferential surface 62 respectively even though the valve is at just opened position. In FIG. 1*a*, they are much wider and longer even up to all the diameter of upstream passageway 53 and the circumference of circumferential surface 62 of the prior art valve, thus the eroded width of upstream surface exposed in the upstream passageway in moving direction of the closure member and the eroded arc length of circumferential surface adjacent to it get to be decreased.

Figure 2B:
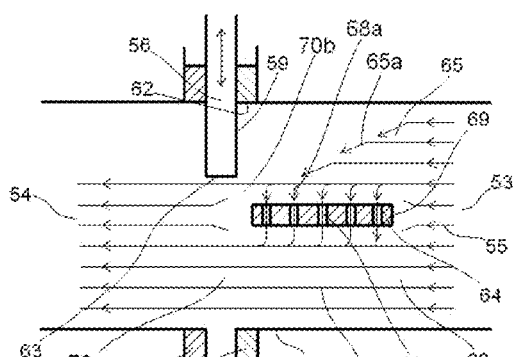

In FIG. 2*b*, the opening of the valve is more than half, channel 66 has been completely opened and channel 65 is partly opened. Upstream surface 59 exposed in channel 65 and upper half a circumference of circumferential surface 62 adjacent to it starts to be eroded, and the eroded width of upstream surface 59 in moving direction of the closure member and the eroded arc length of circumferential surface adjacent to it are respectively less than half a diameter of upstream passageway 53 and half a circumference of circumferential surface 62, similar to channel 66 in FIG. 2*a* or FIG. 1*b* without the baffle plate. It is noticeable that the eroded upstream surface of the closure member close to opening 70*b* in FIG. 2*b* is exactly the same face as in FIG. 2*a*, and is also the face which is always eroded by the fluid during on-off or regulating movement of the closure member, and the eroded circumference surface adjacent to it is not the same half, but other one. Stream 65*a* will experience the same accelerated process from zero to the maximum velocity as stream 66*a* in channel 66 after end 63 of gate closure member 56 enters into channel 65, however, the velocity at the corresponding opening position in FIG. 1b is a continuation speeding up following FIG. 1a and not accelerated from at rest, so the mean velocity of the flow in channel 65 is much lower than the one within a range between two corresponding opening positions of the prior art valve. The velocity decreased dramatically is much in favour of reducing erosion of upstream surface 59 exposed in channel 65 and circumferential surface 62 adjacent to it.

The process closing the valve is just reverse of opening it. Channel 65 is first shut off now, and the flow in it experiences the process from the maximum velocity to zero, its mean velocity is lower, conversely the velocity within a range between two corresponding opening positions of the prior art valve in FIG. 1b can not be reduced markedly due to continuous flow until the channel 66 is fully closed, therefore the mean flow velocity in the valve provided with the present invention device is lower than the one in the prior art valve in a half operation. Lower mean velocity can make the part (the same one in channel 66 of FIG. 2a) of upstream surface 59 close to opening 70b exposed in channel 65 and circumferential surface 62 (different half from the one in channel 66 of FIG. 2a) adjacent to it suffer much less erosion. They will not be eroded any more after end 63 of gate closure member 56 has entered into channel 66 as shown in FIG. 2a, because stream 65a in channel 65 can not flow due to blockage by upstream surface 59. Consequently the eroded width of upstream surface 59 exposed in channel 65 in moving direction of gate closure member 56 and the eroded arc length of circumferential surface adjacent to it are at most equal to half a diameter of upstream passageway 53 and half a circumference of circumferential surface 62 respectively, and the eroded extent of them gets to be mitigated as the principle described in opening the valve in FIG. 2a, As shown in FIG. 2a, channel 65 is blocked by gate closure member 56, the static pressure inside is higher, and end face 63 of gate closure member 56 is staying in channel 66 obstructed partly, the static pressure is lower, because of the fluid flow. There is a differential pressure between channels 65 and 66, this pressure can cause small stream 67a (part of stream 65a) to flow through clearance 67 into channel 66 pressing against upstream surface 59. A layer of small stream 67a almost vertical to streamline of stream 66a will be formed on upstream surface 59a exposed in channel 66 after stream 67a has flowed into channel 66. The layer of small stream 67a separates surface 59a from stream 66a, and adsorbs part of the kinetic energy of stream 66a flowing towards upstream surface 59a, so that it can decrease somewhat the velocity of stream 66a impinging on surface 59a, thereby reduce the erosion of upstream surface 59a and circumferential surface 62 of seat ring adjacent to it, as a result, the eroded extent of them gets to be mitigated. The velocity of small stream 67a can be controlled at lower level by adjusting the width of clearance 67. Near zero angle of incidence of small stream 67a relative to upstream surface 59 and lower velocity can erode neither upstream surface 59 exposed in blocked channel 65, nor upstream surface 59a exposed in channel 66 opened (or closed) partly and circumferential surface 62 adjacent to them.

Furthermore, there are many small through holes or apertures 68 staggered each other in baffle plate 64. For the same reason, this pressure also causes part of stream 65a to flow through them into channel 66. Many smaller streams 68a flowing through holes or apertures 68 flow into stream 66a vertically and are blended with it, so kinetic energy of stream 66a impinging on upstream surface 59a can be reduced. They also form many fluid layers vertical to streamlines of stream 66a in channel 66, the flow velocity of stream 66a flowing towards surface 59a is cushioned by these layers, thus the eroded extent of upstream surface 59a is reduced. On the other hand, the resultant force from many smaller stream 68a will push stream 66a away from baffle plate 64 towards opposite circumference surface of passageway 53, so as to cause part of stream 66a flowing originally towards surface 59a to be deflected to become faced to opening 70a flowing through it in the way being more aimed at it, with the result that the eroded extent of upstream surface 59a and circumferential surface adjacent to it by solid particles or liquid drops carried in stream 66a is reduced.

In FIG. 2b, end 63 of gate closure member 56 is in channel 65, and encircles an opening 70b with baffle plate 64. Channel 66 is opened fully and not obstructed by gate closure member 56 at all, stream 66a can flow unobstructedly through opening 70a in straight streamlines. The velocity of stream 65a is lower than the one of stream 66a because of part obstruction in channel 65 (the velocity in two channels will be the same when the valve is opened fully). Fluids flowing at different velocities have different static pressure, presence of differential pressure causes part of stream 65a to flow through small through holes or apertures 68 in baffle plate 64 into channel 66. As a result, many smaller streams 68a suck the streamlines of stream 65a in channel 65 to close up to baffle plate 64, and make it flow through the opening 70b in the way being more aimed at it. Accordingly, the eroded width and extent of upstream surface 59 exposed in channel 65 and circumferential surface 62 adjacent to it by the solid particles or liquid drops carried in stream 65a get to be shortened and mitigated.

Consequently, upstream surface of the gate closure member eroded by the fluid in the valve upstream passageway will always be the same face close to the valve opening and exposed in each channel after one baffle plate is installed, and the eroded width of the upstream surface in moving direction of the gate closure member and the eroded arc length of the circumferential surface adjacent to it are respectively less than half a diameter of the valve upstream passageway and half a circumference of the circumferential surface of bore of the seat ring. The eroded extent of both surfaces also gets to be mitigated because mean velocity of the stream in one of two channels is decreased and the kinetic energy flowing towards the upstream surface is partly absorbed by many flow layers flowing through the clearance and small through holes or apertures.

In comparison with corresponding FIG. 1a and FIG. 1b, flow layer 67a and 68a flowing through the clearance 67 and small through holes or apertures 68 make fluid 55 change its original flow field and reduce its kinetic energy before it flows into downstream passageway 54, all of these are favour of mitigating erosive effect on the upstream seat ring and housing of the valve during its flowing through openings 70a and 70b.

There will be no any differential pressure between two sides of the baffle plate after both of adjacent channels have been fully opened, and the flow field is nearly the same as the valve without the baffle plate except that a small cross sectional area 69 of the plate causes a bit resistance to fluid flow in upstream passageway.

FIG. 3 is another embodiment of the present invention similar to FIG. 2, there are two baffle plates 71 and 72 mounted in valve upstream passageway 53 now. Baffle plates 71 and 72 are both parallel to axis of passageway 53 and their planes are perpendicular to moving direction of gate closure member 56 respectively. The distance between the plates and the maximum distance between the plate and the circumferential surface of upstream passageway 53 are equal, that is, two baffle plates divide the diameter of passageway 53 into three equal lengths in moving direction of the closure member and the others are the same as the description in FIG. 2.

In FIG. 3, two baffle plates 71 and 72 divide upstream passageway 53 of the valve into three channels 73, 74 and 75, whose cross sections form up into one single file in moving direction of the closure member, to lead streams 73a, 74a and 75a of fluid 55 to flow through. Upstream surface 59 of gate closure member 56 can respectively open or close these channels in sequence during its on-off or regulating movement. Figures 76 and 77, 76a and 77a are designated as the clearances between the sides of baffle plates 71 and 72 and gate closure member 56 and the small streams flowing through them respectively. Many small through holes or apertures staggered each other in baffle plates 71 and 72 and many smaller streams flowing through them are respectively designated as 78, 79 and 78a, 79a.

Figure 3B:
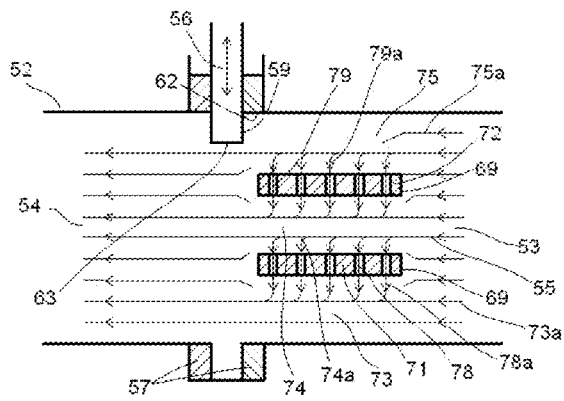
FIG. 3a, FIG. 3b and FIG. 3c are three elevation section views of an improved gate valve provided with a device formed of two baffle plates according to another embodiment of the present invention, showing the closure member in different opening (or closing ) positions respectively.
Figure 3C:
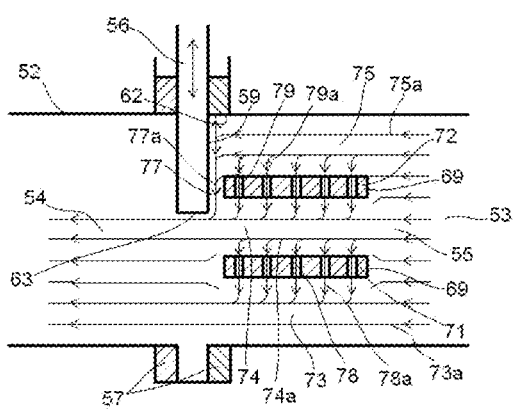
Figure 3A:
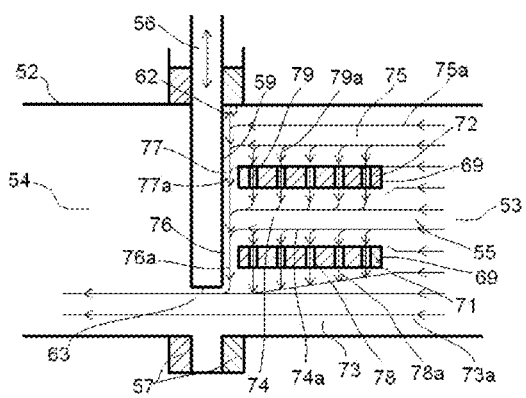

FIG. 3a and FIG. 3b are similar to FIG. 2a and FIG. 2b respectively, their function and principle are not described any more.

In FIG. 3c, end 63 of gate closure member 56 is in channel 74 between baffle plates 71 and 72, and channel 74 is obstructed partly. Since channel 75 is blocked by upstream surface 59 of gate closure member 56, part of stream 75a in channel 75 flows through clearance 77 and many small through holes or apertures 79 staggered each other into channel 74, its function and principle are the same as the description of channel 65 in FIG. 2a. The velocity of stream 74a in channel 74 is lower than the velocity of stream 73a in channel 73 because of partial obstruction of gate closure member 56 in channel 74 and unobstructed flow in channel 73, thus its static pressure in channel 74 is higher than the one in channel 73, part of stream 74a flows into channel 73 under the drive of the differential pressure between two channels, and its function and principle is the same as description in FIG. 2b.

The distances between adjacent baffle plates in moving direction of the closure member can be equal or not in the baffle plate device with two baffle plates.

Except the advantages described in the device with one baffle plate, the device with two baffle plates 71 and 72 in FIG. 3 causes the eroded width of upstream surface 59 exposed in the channels in moving direction of gate closure member 56 and the eroded arc length of circumferential surface 62 of bore of seat ring adjacent to it, to become narrower and shorter relative to the diameter of the valve upstream passageway and the circumference of the circumferential surface of bore of seat ring, and they are respectively less than one third of the diameter and the circumference in the prior art valve. Furthermore the mean flow velocity in two channels opened later (or closed earlier) of total three channels is lower than the one within a range between two corresponding opening positions of the prior art valve respectively. The device with three channels formed of two baffle plates has the advantage that its proportion of the amount of the streams flowing at low mean velocity to the sum of all streams is higher than the one in a device with two channels formed of one baffle plate, consequently the eroded extent of the upstream surface of the closure member and the circumferential surface of bore of the seat ring adjacent to it will be less.

The function and principle of the device with more baffle plates are the same as in FIG. 3, and described no more.

Figure 4:
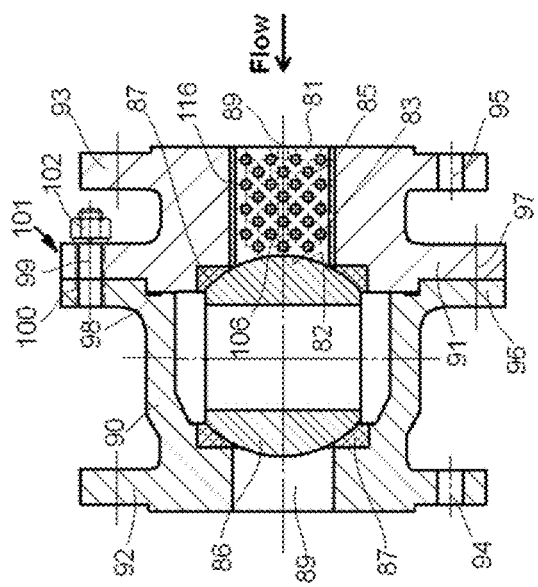
FIG. 4 is a simplified top view of the improved ball valve provided with a device formed of one baffle plate according to the embodiment in FIG. 2.

FIG. 4 is a top view of the improved ball valve with one baffle plate device according the embodiment of the present invention. The ball valve in FIG. 4 is composed of housing 101, ball closure member 86, stem 88 (not shown), seat ring 87 and baffle plate 81. Housing 101 comprises left-hand housing section 90 and right-hand housing section 91 having passageways 89 with cylindrical cross section in generally, which have respective flanges 92 and 93 on their external ends used to be connected with pipelines by threaded studs and nuts (not shown) through holes 94 and 95 on them. A gasket 98 is disposed between the other flanges 96 and 97 on their internal ends used to effect a seal. An end of studs 99 is screwed into tapped holes 100 on flange 96 in section 90, the other end of them passed through registering holes on flange 97 in section 91, and then nuts 102 are screwed onto free ends of studs 99. Gasket 98 is compressed when flanges 96 and 97 are joined together, thereby two sections 90 and 91 form integral valve housing 101. One rectangular baffle plate 81 (or trapezoid when the valve has a reduced bore) arranged in a plane formed from the axis of valve upstream passageway 89 and axis of valve stem (not shown, perpendicular to the paper of FIG. 4) is fixed in upstream passageway 89 of right-hand housing section 91, or are first attached to opposite faces of circumferential surface of a sleeve (not shown) and then the sleeve is inserted in upstream passageway 89 keeping baffle plate 81 being perpendicular to moving direction of ball closure member 86. Two kinds of fastening means are the same as the description above.

One side 83 of the other pair of opposite sides closes up to or engages with upstream surface 82 of ball closure member 86 and the other side is flush with end face of upstream flange 93. Baffle plate 81 divides upstream passageway 89 upstream of ball closure member 86 into two channels, whose cross sections form up into one single file in moving direction of ball closure member 86, to permit the fluid to flow through, and the device makes the fluid be split into two streams flowing in both the channels immediately it flows into passageway 89. Upstream surface 82 of ball closure member 86 can respectively open or close these two channels in sequence during on-off or regulating movement of ball closure member 86 in the valve.

Side 83 of baffle plate 81 has the same curvature as surface 82 of ball closure member 86. There are many small through holes or apertures 85 staggered each other in baffle plate 81.

The difference between FIG. 4 and FIG. 2 is the shape of the closure member, one is spheroid in FIG. 4 and the other is plate in FIG. 2, but both valves have the same function and principle. Therefore the embodiment illustrated in FIG. 4 has the same advantages as in FIG. 2.

Figure 5C:
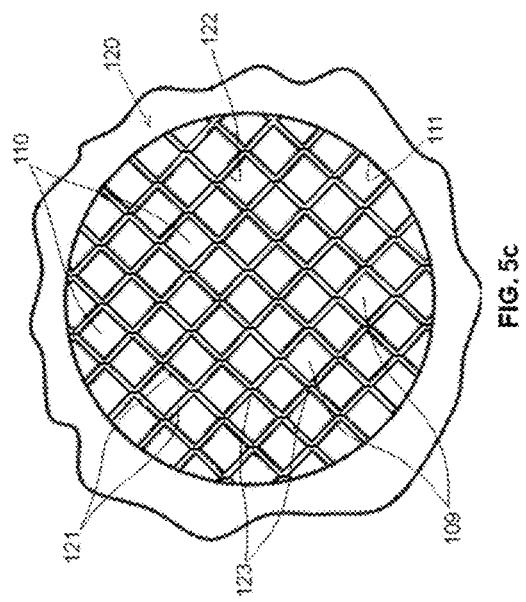
FIG. 5c is a fragmentary side view of an improved valve provided with a cylindrical device having a honeycomb or reticulated cross section formed of some corrugated metal plates disposed oppositely and welded together at their crests to divide the valve upstream passageway into many elongated square section tubes arranged side by side.
Figures 5A, 5B:
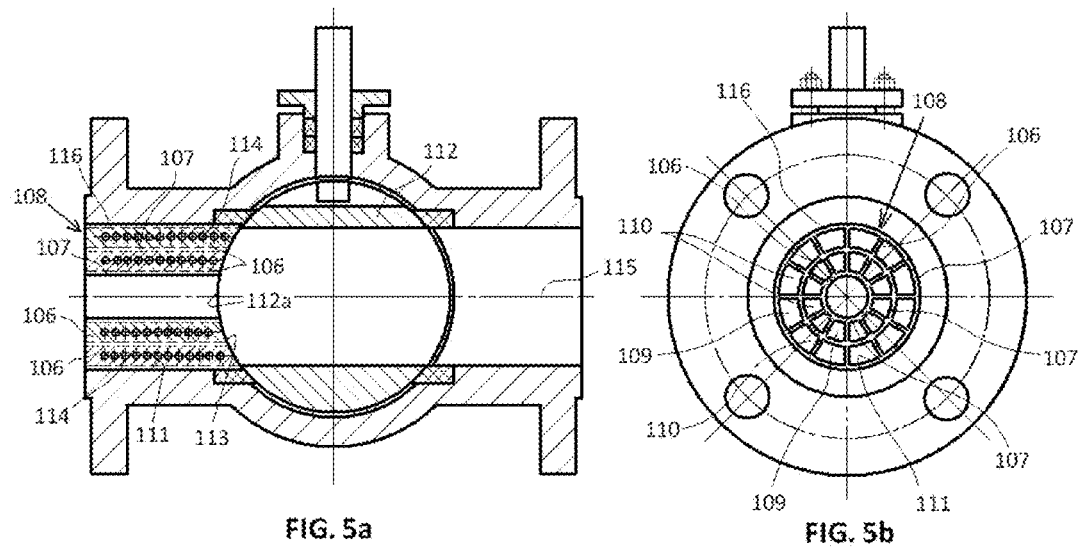
FIG. 5a and FIG. 5b are elevation and side section views of an improved ball valve provided with a cylindrical device having a honeycomb or reticulated cross section enclosed by several concentric circular plates with stiffening ribs to divide the valve upstream passageway into many elongated and sectorial section tubes arranged side by side.

One baffle plate is shown in FIG. 4, two or more baffle plates can be also arranged in upstream passageway of the ball valve of course, the function and principle of the device with two or more baffle plates can refer to the description in FIG. 3. FIG. 5a, FIG. 5b and FIG. 5c are alternative embodiments of improved ball valve according to the present invention, FIG. 5a is an elevational section view of a ball valve provided with one cylindrical device 108 which is enclosed by three concentric plates 107 joined with many stiffening ribs 106 for strength to form into many tubes 109 with sectorial cross sectional arranged side by side, and FIG. 5b is its side view in which cross section of the device takes the shape of honeycomb or reticulation. FIG. 5c is a fragmentary side view of the upstream end face of the ball valve provided with a cylindrical device 120 mounted in its upstream passageway 111 and having a honeycomb or reticulated section. Device 120 is formed of some corrugated metal plates 121 disposed oppositely and welded (or any other fastening means, for instance, glued) together at their crests 123 to form many elongated square sectional tubes 109 arranged side by side. The device according to the invention can be also consisted of many elongated tubes having regular sectional shape such as sectorial, circular, rectangular, trapezoidal, triangular, hexagonal, elliptical tubes, or any other abnormity sectional shape and welded together along their adjacent external surfaces (not shown). Size and geometrical shape of cross section of the elongated tubes in the devices can be the same each other or not.

All of them have the same function and principle although shaping means, shapes of cross section and/or size of the elongated tubes could be different, so device 108 arranged by sectorial cross section tubes 109 is the only illustration of them underneath.

In FIG. 5, longitudinal axes of tubes 109 in device 108 are parallel to the axis 115 of said upstream passageway 111 and the cross sections of tubes 109 form up into many files in moving direction of the closure member. Many tubes 109 in tube device 108 divide valve upstream passageway 111 into many channels 110 to permit the fluid to flow through, and device 108 makes the fluid be split into many streams flowing in these channels immediately it flows into passageway 111. The upstream surface of ball closure member 112 can respectively open or close each channel in every file in sequence during its on-off or regulating movement in the valve.

The exterior surface of tube device 108 can be directly attached to interior circumferential surface of valve upstream passageway 111 firmly, or be attached to the bore of sleeve 116 in advance and then the sleeve is inserted in upstream passageway 111. The means fastening tube device 108 in upstream passageway 111 or sleeve 116 can be the same as the baffle plate device As shown in FIG. 5a, end face 113 of tube device 108 close to ball closure member 112 has the same geometrical shape and curvature as its upstream surface 112a, and engages or keeps an appropriate and equal clearance with it. In addition, there are many small through holes or apertures 114 staggered each other in the tube walls 122. The function and principal of the clearance and the holes or apertures are the same as the baffle plate device described above, so described no more.

Like the baffle plate device in the embodiments described above, the paths for the streams flowing radially towards the circumferential surface of bore of seat ring have been shut off in the channels obstructed partly and not being adjacent to the circumferential surface of bore of seat ring in tube device 108, and the paths for the streams flowing tangentially round the circumferential surface of bore of seat ring are also shut off in the channels obstructed partly and being adjacent to the circumferential surface in tube device 108 just like the baffle plate device. Therefore tube device 108 eliminates the possibility of the dispersed fluids' converging into two streams flowing round the circumferential surface in opposite directions, too.

As compared with the baffle plate device described above, the eroded width of upstream surface of ball closure member in its moving direction and the eroded arc length of circumferential surface 62 adjacent to the width are much narrower and shorter. Reducing the width of all channels in moving direction of ball closure member can make the proportion of the amount of the streams flowing at low mean velocity to the sum of all streams be greatly raised. Moreover absorption of kinetic energy of the streams flowing in the channels and cushioning effect of the flow layers on the streams, as well as the function to flow through the valve upstream opening in the way being more aimed at the opening, all of these cause the tube devices to have the same advantages to mitigate erosion extent of upstream surface of the closure member and circumferential surface of bore of the upstream seat ring adjacent to it further.

It can be completely understood through the detailed description for the baffle plate device and the tube devices above that the technology of the present invention can also be used in another equipments in the pipeline system which conveys the fluid carrying solid particles or liquid drops to cause the parts installed in them to suffer less erosion by the fluid.

Although the present invention was described in terms of specific embodiments, it is obvious to a person skilled in the art that various alterations and additions are possible without departing from the spirit of the invention which is set out in the appended claims, therefore the extent disclosed in the embodiments above is only for purpose of illustration and not intended to be limited by this description.

What is claimed is:

1. A valve provided with a cylindrical device for enhancing the capability of a closure member of the valve and related seat ring for resisting erosion by the fluid with solid particles of grains, powders, crystals, polymers or liquid drops when it is used in applications for on-off or regulation, comprising:

a. a body housing, said body housing having an upstream passageway and a downstream passageway which have respectively flanges on their external ends for connecting with pipelines, and an inner chamber therebetween adapted to dispose a valve closure member, an opening passing through said body housing and being perpendicular to an axis of said upstream and downstream passageways for receiving a valve stem, a pair of annular recesses composed of a radial shoulder and an interior circumferential surface surrounding said passageways adjacent to the inner chamber for accommodating two seat rings respectively;

b. a closure member, said closure member being disposed in said inner chamber, and rotating about or reciprocating along an axis of said stem relative to said body housing for shutting off or throttling the said fluid flowing through said passageways;

c. a pair of seat rings, said seat rings positioned within said annular recesses in the passageways of said body housing, and clamped by said body housing and said closure member respectively, each of said seat rings having one radial end face engaged with the exterior surface of said closure member for shutting off said fluid flowing in said body housing together with said closure member when the valve is closed, and the opposite radial end face abutted on the shoulder in said annular recesses; and the bore of said seat rings surrounding the passageways respectively;

d. wherein the exterior surface of said cylindrical device is held in an interior circumferential surface of the upstream passageway of said valve housing; and e. wherein said cylindrical device comprises of at least one baffle plate arranged respectively in one or more planes formed from either said axis, or straight lines parallel to said axis, of said upstream passageway and a straight line simultaneously perpendicular to said axis of said upstream passageway, or at least one straight line parallel to said axis of said upstream passageway and a straight line in a moving direction of said closure member; wherein the at least one baffle plate in said cylindrical device divides the upstream passageway of said valve into two or more channels whose cross sections form up into at least one single file in a moving direction of said closure member to permit said fluid to flow through, so that the fluid flowing into said upstream passageway towards said closure member is split into two or more streams flowing in said channels, and the upstream surface of said closure member respectively opens or closes each channel in every single file in sequence while it is rotating or reciprocating in said valve; wherein two opposing sides of said at least one baffle plate are parallel to said axis of said upstream passageway, and each comprise cylindrical surface contours that are firmly attached to opposite faces of the circumferential surface of said upstream passageway.

2. The valve as recited in claim 1, wherein said cylindrical device comprises many elongated tubes forming said two or more channels; said elongated tubes being welded together along their adjacent external surfaces, and whose longitudinal axes are parallel to the axis of said upstream passageway, divide the upstream passageway of said valve into many channels whose cross sections form up into two or more single files in moving direction of said closure member to permit the fluid to flow through, so that the fluid flowing into said upstream passageway towards said closure member is split into many streams flowing in said channels, the upstream surface of said closure member respectively opens or closes each channel in every single file in sequence while it is rotating or reciprocating in said valve; the cylindrical exterior surface of said cylindrical device has the same size and geometrical shape as an interior circumferential surface of said valve upstream passageway.

3. The valve as recited in claim 2, wherein the elongated tubes are formed of corrugated metal plates disposed oppositely by welding together at their crests.

4. The valve as recited in claim 2, wherein the radial end surface of one end of said cylindrical device close to said closure member has the same geometrical shape and curvature as the upstream surface of said closure member for keeping a clearance or engaging with it.

5. The valve as recited in claim 4, wherein the other end face of said cylindrical device away from said closure member is flush with an end face of the valve flange at upstream or connecting end of upstream section of said valve.

6. The valve as recited in claim 2, wherein there are many small through holes or apertures in walls of tubes of said cylindrical device.

7. The valve as recited in claim 2, wherein said cylindrical device is mounted in a sleeve in advance firmly and then said sleeve is attached to the upstream passageway of said valve.

8. The valve as recited in claim 1, wherein the sides of said cylindrical devices close to said closure member has the same geometrical shape and curvature as the upstream surface of said closure member for keeping a clearance or engaging with it.

9. The valve as recited in claim 8, wherein the sides of the baffle plates away from said closure member are flush with an end face of an valve flange at a connecting end of an upstream section of said valve.

10. The valve as recited in claim 1, wherein there are many small through holes or apertures staggered from each other in walls of the baffle plates of said cylindrical device.

11. The valve as recited in claim 1, wherein said cylindrical device is firmly mounted in a sleeve in advance and then said sleeve is attached to the upstream passageway of said valve.

* * * * *